US010228995B2

(12) United States Patent
Silversides et al.

(10) Patent No.: US 10,228,995 B2
(45) Date of Patent: Mar. 12, 2019

(54) LAST WRITERS OF DATASETS IN STORAGE ARRAY ERRORS

(71) Applicant: Hewlett Packard Enterprise Development LP, Houston, TX (US)

(72) Inventors: Tim Silversides, Dromore (GB); Stuart McCool, Belfast (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 93 days.

(21) Appl. No.: 15/221,728

(22) Filed: Jul. 28, 2016

(65) Prior Publication Data
US 2018/0032397 A1 Feb. 1, 2018

(51) Int. Cl.
*G06F 11/07* (2006.01)
*G06F 12/0802* (2016.01)
*G06F 3/06* (2006.01)
*G06F 12/0806* (2016.01)
*G06F 12/0866* (2016.01)
*G06F 11/10* (2006.01)

(52) U.S. Cl.
CPC ........... *G06F 11/079* (2013.01); *G06F 3/064* (2013.01); *G06F 3/0619* (2013.01); *G06F 3/0673* (2013.01); *G06F 11/1004* (2013.01); *G06F 12/0802* (2013.01); *G06F 12/0806* (2013.01); *G06F 12/0866* (2013.01); *G06F 2212/1024* (2013.01); *G06F 2212/224* (2013.01); *G06F 2212/313* (2013.01); *G06F 2212/60* (2013.01)

(58) Field of Classification Search
None
See application file for complete search history.

(56) References Cited

U.S. PATENT DOCUMENTS

| 5,909,540 | A  | * | 6/1999  | Carter  | G06F 9/5016 707/E17.12 |
| 6,574,752 | B1 | * | 6/2003  | Ahrens  | G06F 11/0745 711/148 |
| 6,938,188 | B1 | * | 8/2005  | Kelleher| G06F 11/221 714/43 |
| 6,965,936 | B1 | * | 11/2005 | Wipfel  | G06F 11/1482 709/201 |
| 6,981,171 | B2 | * | 12/2005 | Hashemi | G06F 11/1076 711/114 |

(Continued)

OTHER PUBLICATIONS

Carroll, J., Combined Methods in Preservation Aware Infrastucture, (Research Paper), Jun. 19, 2014, 2 Pgs.

(Continued)

*Primary Examiner* — Steve N Nguyen
(74) *Attorney, Agent, or Firm* — Hewlett Packard Enterprise Patent Department (57) ABSTRACT

Examples discussed herein are directed to last writers of datasets in storage array errors. In some examples, a dataset integrity error detection is recorded. The dataset integrity error may be in a write path of a storage array and the write path may include a first controller node and a second controller node of the storage array. A detector of the dataset integrity error may be determined. A last writer of the dataset in the write path prior to the dataset integrity error detection may also be determined. A processing location in the write path associated with the dataset integrity error may be determined.

16 Claims, 5 Drawing Sheets

(56) References Cited

U.S. PATENT DOCUMENTS

| | | | | |
|---|---|---|---|---|
| 7,058,844 | B2* | 6/2006 | Wiley | H04L 1/0061 |
| | | | | 714/4.5 |
| 7,225,395 | B2 | 5/2007 | Henry | |
| 7,392,425 | B1* | 6/2008 | Schoenthal | G06F 11/2069 |
| | | | | 707/999.202 |
| 7,761,608 | B2 | 7/2010 | Rohde et al. | |
| 8,473,816 | B2 | 6/2013 | Zvibel | |
| 8,495,469 | B2 | 7/2013 | Bakke et al. | |
| 8,583,984 | B2 | 11/2013 | Schmisseur et al. | |
| 8,806,282 | B2 | 8/2014 | Shetty et al. | |
| 9,607,085 | B2* | 3/2017 | Peters | G06F 17/30864 |
| 2002/0108076 | A1* | 8/2002 | Barenys | G06F 11/221 |
| | | | | 714/43 |
| 2003/0016629 | A1* | 1/2003 | Bender | H04L 1/22 |
| | | | | 370/245 |
| 2006/0212752 | A1* | 9/2006 | Mechalke | G06F 11/0727 |
| | | | | 714/47.3 |
| 2006/0248370 | A1* | 11/2006 | Almasi | G06F 11/1633 |
| | | | | 714/4.1 |
| 2007/0027999 | A1* | 2/2007 | Allen | G06F 11/0727 |
| | | | | 709/238 |
| 2009/0222687 | A1* | 9/2009 | Baker | H04L 41/0663 |
| | | | | 714/4.11 |
| 2012/0311716 | A1 | 12/2012 | Amann et al. | |
| 2013/0007531 | A1 | 1/2013 | Jibbe et al. | |
| 2013/0198585 | A1 | 8/2013 | Braam et al. | |
| 2013/0226887 | A1 | 8/2013 | Braam et al. | |
| 2013/0346723 | A1 | 12/2013 | Kawamura | |
| 2015/0082435 | A1 | 3/2015 | Roussellet et al. | |

OTHER PUBLICATIONS

Holt, K., End-to-end Data Protection Justification, (Research Paper), Jul. 1, 2003, 7 Pgs.

Fujitsu Limited, "End-to-end Data Protection Using Oracle Linux with the ETERNUS DX S3 Series and QLogic 2600 Series FC HBA," White Paper, 2015, 4 Pgs., http://www.fujitsu.com/downloads/STRSYS/system/dx_s3_Oracle_Linux_T10_PI_Q_en_01.pdf, 2015.

George Penokie, "SPC-3; SBC-2; End-to-End Data Protection," Nov. 6, 2003, 43 Pgs., T10/03-365, rev. 1, <http://www.t10.org/ftp/t10/document.03/03-365r1.pdf>.

Huawei Technologies Co., Ltd, "End-to-end Data Integrity Protection in Storage Systems," Technical White Paper, Nov. 20 2013, 14 pages.

Keith Holt, "End-to-End Data Protection Justification," Jul. 1, 2003, 7 Pgs., T10/03-224r0, <http://www.t10.org/ftp/t10/document.03/03-224r0.pdf>.

EMC Corporation, "An Integrated End-to-End Data Integrity Solution to Protect Against Silent Data Corruption", Aug. 2012, White Paper, http://www.oracle.com/us/technologies/linux/data-integrity-solution-1852762.pdf.

EMC Corporation, "Data Integrity on VNX," Mar. 2016, <https://www.emc.com/collateral/hardware/white-papers/h11181-data-integrity-wp.pdf>.

Huawei Technologies Co., Ltd., "End-to-end Data integrity Protection in Storage Systems," Technical Whitepaper, Nov. 20, 2013, <https://web.archive.org/web/20140819090402/http://enterprise.huawei.com/ilink/enenterprise/download/HW_309360>.

Martin K. Petersen, "I/O Controller Data Integrity Extensions," Nov, 19, 2009.

Martin K. Petersen, "Linux Data Integrity Extensions," Jul. 2008, Proceedings of the Linux Symposium, <https://www.kernel.org/doc/ols/2008/ols2008v2-pages-151-156.pdf>.

Martin K. Petersen, "T10 Data Integrity Feature (Logical Block Guarding)," 2007, <https://www.usenix.org/legacy/event/lsf07/tech/petersen.pdf>.

Martin Petersen, "Proactively Preventing Data Corruption," 2008, <http://martinpetersen.sys-con.com/node/480659/mobile>.

Medha Fox, "End-to-end data protection using T10 standard data integrity field," May 24, 2011, <https://www.ibm.com/developerworks/aix/library/au-T10E2E/index.html>.

Wikipedia, "Data Integrity Field," Jun. 12, 2015, <https://en.wikipedia.org/w/index.php?title=Data_Integrity_Field&oldid=666581921>.

George Penokie, "SPC-3; SBC-2; End-to-End Data Protection," Nov. 6, 2003, T10/03-365, revision 1.

* cited by examiner

LAST WRITERS OF DATASETS IN STORAGE ARRAY ERRORS

BACKGROUND

A storage array generally includes a cluster of controller nodes with a large data cache. The array may be communicatively linked to persistent storage, and to host devices, that may write to and read from the persistent storage presented by the storage array. To meet robustness requirements of a data center, the storage array may provide mechanisms for detecting corruption of data during transmission or at rest.

BRIEF DESCRIPTION

Some examples are described with respect to the following figures.

DETAILED DESCRIPTION

Data that flows through a storage array may go through various "data hops" depending on the architecture of the storage array. These data hops may occur during the processing of a host write request to a persistent storage device or during the processing of a host read request from the persistent storage.

For example, in a storage array system with multiple interfacing controller nodes, attached host devices, and attached persistent storages, data associated with a write request by an attached host may "hop" from the host to the storage array. Within the storage array, the data may be duplicated on multiple controller nodes (and thus "hopping" from one controller node to another controller node) before finally being committed to the attached persistent storage.

During these hops, the data may become corrupt (i.e., the integrity of the data is compromised) due to faulty operation of either hardware or software components of the storage array system. Detection and notification of such corruption may be valuable, as it permits the storage administrator to take suitable and timely recovery action. For example, corrupt data that is not detected and stored in a corrupted state may be difficult to recover from later. Such corruption may be detected using protection information associated with the data.

However, in some examples, it may be valuable to identify the surrounding context of the corruption (e.g., the detector of the corrupted data, the last writer of the corrupted data, etc.) in addition to detecting the corruption. Surrounding context information may allow the storage administrator to diagnose the fault in the storage array. Without the surrounding context, it may be difficult to fix the underlying cause of the corruption (e.g. to pinpoint a faulty hardware component in the storage array, etc.). This is especially true in storage arrays with multiple controller nodes, where data paths may vary from one operation to the next.

Examples disclosed herein address these technological issues by allowing the detection of data corruption in a write path of a storage array and identifying the surrounding context of the corruption. Examples disclosed allow the system to determine which component of the storage array detected the corruption and which component last altered or generated the data prior to the detection. These determinations are recorded and may be displayed to a user of the storage array. In some examples, the system may use multiple corruption detections to determine a malfunctioning component of the storage array system. Thus, examples disclosed herein may allow for quicker and more robust error analysis and storage array maintenance.

In some examples, a non-transitory machine-readable storage medium with instructions is provided. The instructions, when executed, cause a processing resource to record a dataset integrity error detection in a write flow path of a storage array. The write flow path comprises a first controller node and a second controller node of the storage array. The instructions, when executed, also cause the processing resource to determine a detector of the dataset integrity error, determine a last writer of the dataset in the write flow path prior to the detection, and determine a processing location in the write flow path associated with the dataset integrity error.

In some examples, a storage array is provided including a first controller node, a second controller node, an interconnect engine, and an error engine. The first controller node may include a first host bus adapter to process a write request of a dataset from a host device. The first controller node may also include a first cache to hold first dataset description data. The second controller node may include a second cache to hold second dataset description data and a second host bus adapter to process the write request of the dataset to a persistent storage. The interconnect engine is to communicate between the first controller node and the second controller node to process the write request. The error engine is to record a dataset integrity error during the write request processing and to determine a last writer of the dataset prior to the dataset integrity error detection.

In some examples, a method is provided including recording a first dataset integrity error in a first write path in a storage array, and recording a second dataset integrity error in a second write path in the storage array. The first dataset integrity error is associated with a first dataset and the second dataset integrity error is associated with a second dataset. The method also includes determining a second detector of the second dataset integrity error, determining a last writer of the first dataset prior to the first dataset integrity error, and determining a malfunctioning component of the storage array based on the first detector, the second detector, and the last writer of the first dataset. The method is performed with a processing resource.

The following terminology is understood to mean the following when recited by the specification or the claims. The singular forms "a," "an," and "the" mean "at least one." The terms "including" and "having" have the same inclusive meaning as the term "comprising."

Figure 1:
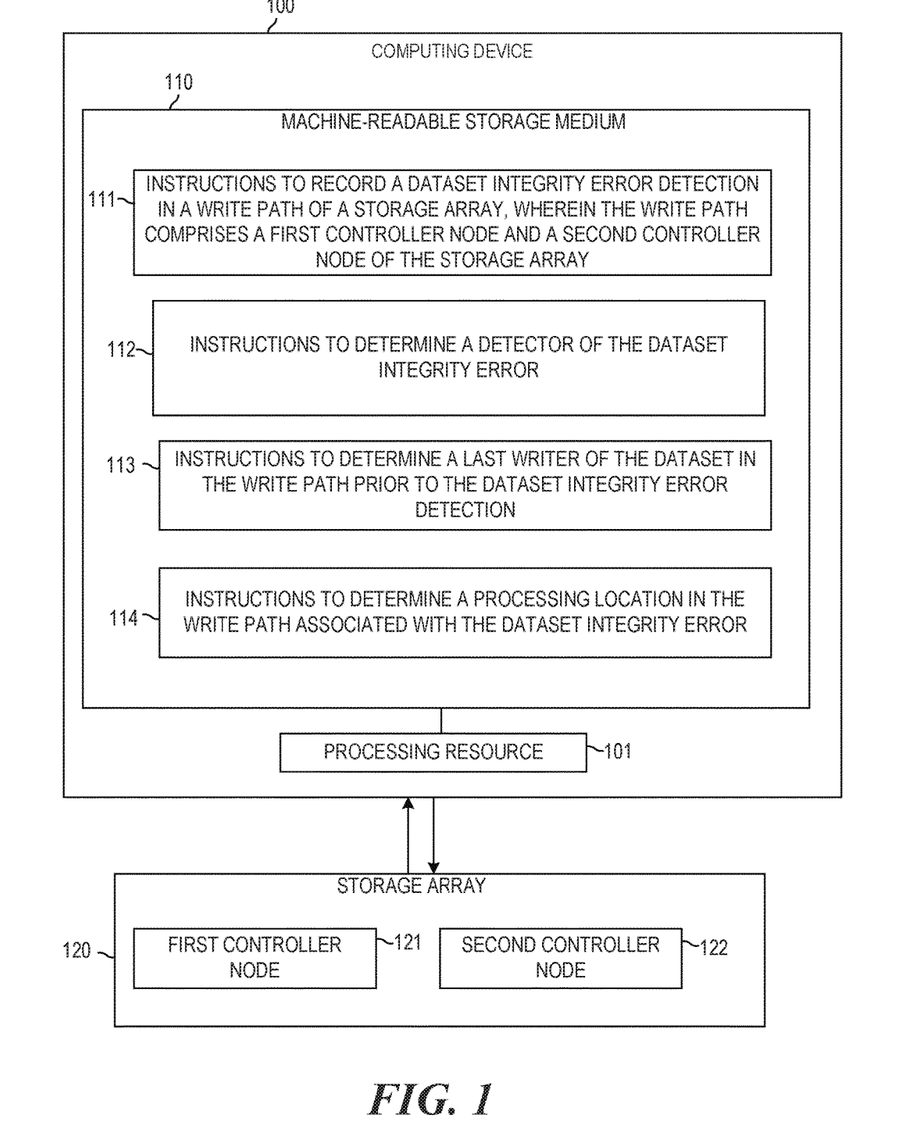
FIG. 1 is a block diagram of a computing device to determine a last writer of a dataset in a dataset integrity error detection, according to some examples.

Referring now to the figures, FIG. 1 is a block diagram of a computing device 100 to determine a last writer of a dataset in a dataset integrity error detection. As used herein, a "computing device" may be a web-based server, a local area network server, a cloud-based server, computer networking device, chip set, desktop computer, workstation, or any other processing device or equipment. In some examples, computing device 100 may be a server that interfaces with a plurality of other computing devices, such as storage array 120.

Computing device 100 includes a processing resource 101 and a machine-readable storage medium 110. Machine-readable storage medium 110 may be in the form of non-transitory machine-readable storage medium, such as suitable electronic, magnetic, optical, or other physical storage apparatus to contain or store information such as instructions 111, 112, 113, 114, related data, and the like.

As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and/or a secondary memory. The secondary memory can, for example, include a nonvolatile memory where a copy of software or other data is stored.

In the example of FIG. 1, instructions 111, 112, 113, and 114 are stored (e.g., encoded) on storage medium 110 and are executable by processing resource 101 to implement functionalities described herein in relation to FIG. 1. In some examples, storage medium 110 may include additional instructions, like, for example, the instructions to implement some of the functionalities described in relation to storage array 300 of FIG. 3. In some examples, the functionalities of any of the instructions of storage medium 110 may be implemented in the form of electronic circuitry, in the form of executable instructions encoded on machine-readable storage medium, or a combination thereof.

Processing resource 101 may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 111, 112, 113, and 114, as described herein.

Instructions 111 may be executable by processing resource 101 such that computing device 100 records a dataset integrity error detection in a data path of storage array 120. In some examples, storage array 120 may include a first controller node 121 and a second controller node 122 that interact with each other to process a data request of a host device (not shown in FIG. 1). For example, when a host device issues a data write request, the data is sent to the storage array, processed in the storage array, and then committed to a persistent storage that interacts with storage array 120. As another example, when a host device issues a data read request, the data is read from the persistent storage, processed in the storage array, and then sent to the host device. As used herein, a controller node may be a computing device, for example, any computing device that is capable of communicating with at least one host device and/or with at least one persistent storage. In some examples, multiple controller nodes may be implemented by the same computing device, for example, where each controller node is run by a different virtual machine or application of the computing device. In general, a controller node may monitor the state of the persistent storage and may handle requests by host devices to access the persistent storage via various physical paths. Thus, in some examples, a cluster of controller nodes allows storage array 120 to present to a host device a single pool of storage from multiple persistent storages.

In some examples, instructions 111 allows computing device to record a dataset integrity error detection in a write path of storage array 120. As understood herein, a "write path" is a path that data takes to the persistent storage. The write path may include movement of the data between controller nodes of the storage array (e.g., duplication of the dataset from one controller node to another controller node, etc.). The write path may also include the movement of data from the host device to the controller nodes. In other words, a write path is used in the processing of a write request (issued by a host device or by a component of the storage array) of data by storage array 120. For example, a write path may include a transfer of data from a host device to first controller node 121 in storage array 120, a transfer of that data from first controller node 121 to second controller node 122, and a transfer of that data from second controller node 122 to a persistent storage (not shown in FIG. 1). As another example, a write path may include a transfer of a data generated by the storage array 120 from a random access memory (e.g., where the data generated may be metadata used by storage array 120, etc.) of first controller node 120 to a cache in the first controller node 121, a transfer of that data to second controller node 122, and a transfer of that data from second controller node 122 to a persistent storage.

Thus, in some examples, the recorded dataset integrity error occurs in a write path that includes data hops from a first controller node to a second controller node. As discussed above, the duplication of the data (i.e. mirroring) in multiple controller nodes allows the storage array to have multiple copies of the data in the event of storage array failure. Accordingly, the inclusion of these hops in an error analysis system, as described herein, may allow for a more comprehensive analysis of errors occurring in the storage array.

In some examples, and as discussed above, the data may be corrupted during the transfers of the data in the write path. Thus, protection information may be associated with the data during the write path. In some examples, a 16-bit cyclic redundancy check ("CRC") of the data and a 32-bit offset or Logical Block Address may be utilized as the protection information. In some examples, the format of the protection information may match that of the industry-wide T10 Small Computer System Interface ("SCSI") specifications. Protection information can include a CRC for verifying that the data is not modified, a serial number for verifying a source of the data, and an offset for determining where to start reading the data.

For example, a host device interacting with storage array 120 may include a suitable HBA device driver installed on its operating system (OS) allowing the host device to use protection information. When initiating a data transmission, the host bust adapter (HBA) device driver may add protection information to the data packet, which allows for data transmissions to be validated during the back and forth communications between the host device and the storage array 120.

For example if data-out SCSI block commands (i.e., commands where block data transfer from initiator to target takes place) are used, protection information instructions can ensure that protection information is inserted into the write data on data transfer to the storage array and can indicate in a protection information format, such as a T10 SCSI command, that such protection information is included. The storage array 120, in turn, can validate the protection information and return an invalid SCSI status to the host device in the event that this validation fails (e.g., by using a host bus adapter at a front end of a controller node). As another example, a host device interacting with storage array 120 may not include a suitable HBA device driver installed on its operating system. In that example, storage array 120 may include a HBA either on first controller node 121 or second controller node 122 that adds the protection information on data transfer into the first controller node 121 or the second controller node 122.

Thus, in some examples, a dataset that flows through the storage array may include the original data block from the host device and the protection information associated with the original data block. The dataset is then verified as it flows through the storage array 120 (e.g., by comparing the associated protection information with new protection information computed of the data block).

Thus, in some examples, storage array 120 may detect a dataset integrity error (e.g., by being unable to validate the protection information associated with the dataset). In some examples, the detection may be done by a front-end HBA of a controller node 121 or controller node 122. In some examples, the detection may be done by a communication interface (e.g., two application specific integrated circuits (ASIC) and associated communication lines) between controller node 121 and controller node 122. In some examples, the detection may be done by a back-end HBA of a controller node 121 or controller node 122. In yet other examples, the detection may be done by instructions on controller node 121 or controller node 122.

Accordingly, instructions 111 allows computing device 100 to record the dataset integrity error detected by storage array 120. For example, a signal may be sent by storage array 120 to computing device 100 indicating that a component of storage array 120 has detected a dataset integrity error. As used herein, a dataset integrity error is an indication that the dataset is corrupt, or does not reflect the information contained in the original data block sent by the host device in the write request. For example, a dataset integrity error may be indicated by an inability to validate the protection information associated with the original data block.

In some examples, instructions 111 may allow computing device 100 to record the dataset integrity error in an error database (not shown in FIG. 1) stored in a memory. This memory may be separate from machine-readable storage medium 110 or may be implemented by machine-readable storage medium 110. In some examples, the error database may be non-volatile such that it may be accessed after a re-boot of computing device 100.

Instructions 112 may be executable by a processing resource 101 such that computing device 100 determines a detector of the dataset integrity error. As used herein, a detector is a component of the storage array 120 that determines a dataset integrity error. For example, a front-end HBA may be a detector. As another example, the communication interface between controller node 121 and controller node 122 may be a detector. As yet another example, the back-end HBA of a controller node may be a detector. As yet another example, a detector may be instructions on a controller node separate from the front-end HBA, communication interface, or back-end HBA, that may determine a dataset integrity error. In some examples, where the write path includes first controller node 121 and second controller node 122 and the error occurs while data is being transferred from one node to another node, a detector may be the communication interface between controller node 121 and controller node 122. In some examples, where the write path includes first controller node 121 and second controller node 122 and the error occurs while data is being transferred from one node to another node, a detector may be a back-end HBA of controller node 121 or controller node 122.

In some examples, instructions 112 may include instructions to receive information from the storage array that identifies the detector to the computing device 100. In some examples, instructions 112 may also include instructions to record the detector in the error database in memory, as discussed above.

Instructions 113 may be executable by a processing resource 101 such that computing device 100 determines a last writer of the dataset in the write path prior to the detection. As used herein, the "last writer" is the most recent component in storage array 120 that altered or generated the dataset before the dataset reached the detector. For example, when the detector is a communication interface between the first controller node 121 and the second controller node 122, a last writer of the dataset before the error is detected by communication interface may be the front-end HBA of the first controller 121 that wrote the dataset into a cache of the first controller node 121. As another example, where the detector is a communication interface between the first controller node 121 and the second controller node 122, a last writer of the dataset may be the communication interface itself. In these examples, a data write request by a host device may include data that is related to already existing data in a cache of a controller node in storage array 120 (e.g., where a host device writes a small data block related to a page cache already in existence in a cache of first controller node 121). Communication interface may generate a new dataset that merges the two datasets. Before the new dataset (comprising the merged datasets) is duplicated to another controller node (e.g., second controller node 122), the communication interface validates the protection information associated with the new dataset.

In some examples, instructions 113 may include instructions to query a portion of memory in storage array 121 storing a dataset description data to determine the last writer.

For example, first controller node 121 may include storage to hold first dataset description data and second controller node 122 may include storage to hold second dataset description data. A description data for a specific dataset may store information about the specific dataset, including a writer that generated or altered the dataset. When a specific dataset is altered or generated by a component of storage array 120, the description data for that specific dataset is altered to reflect that the component that altered or generated the dataset. The description data for a specific dataset is transferred and updated along with the specific dataset each time the dataset is transferred. In some examples, the description data holds the last writer of the dataset (e.g., the last component that altered or generated the dataset) and does not hold all writers of the storage array 120 that altered or generated the dataset. Thus, a previous writer (e.g. from a previous write of the dataset) that is held in dataset description data is erased, and the dataset description data is updated to reflect a new writer each time the dataset is altered or written.

In some examples, one dataset may be represented by a one dataset description data. In other examples, at least two datasets may be represented by a certain dataset description data (e.g., two datasets, three datasets, four datasets, etc.). In examples where at least two datasets are represented by a single dataset description data, a dataset (i.e. the original data block and the protection information associated with the original data block) may be managed by the storage array 121 as a page. A page may include multiple fixed-size datasets. For example, a dataset may include the protection information and a data block of 512 bytes. A page may represent 16 KB of data (32 blocks of 512 bytes along with protection information).

Thus, in some examples, dataset description data may store information that is common to the datasets in a single page. For example, a dataset may be written into a cache page. The cache page has an associated dataset description data that holds the last writer of the last dataset written into the cache page. In some instances, a writer of the dataset matches the writer in the dataset description data associated with the cache page. This results in no change to the dataset description data.

However, in some instances, a writer of the dataset does not match the writer in the dataset description data associated with the cache page. In some examples where the writers do not match, the dataset description data associated with the cache page is updated to reflect the new writer of the new dataset recently written into the cache page. In other examples, the dataset description data is updated to reflect that the writer is unknown.

In some examples, instructions 113 may determine which dataset contains the error (and thus which dataset description data to query) based on an address of the detector. In some examples, each detector may be associated with a unique address. In some examples, the address may be received by instructions along with the error signal sent by the storage array 120. In other examples, the address may be additional information obtained separately from the error signal. For example, instructions 113 may include instructions to perform a handshake operation with storage array 120 to query the storage array 120 for the address. For example, where datasets are managed by page, an error that occurs in one dataset is associated with a detector with an address, as discussed above. Instructions 113 may include instructions to determine a page in which the error appears based, at least in part, on the address.

In some examples, instructions 113 may also include instructions to record the last writer in the error database in memory, as discussed above.

Instructions 114 may be executable by processing resource 101 such that computing device 100 determines a processing location in the write path at which the error occurred. A processing location is different from a detector of the error. A detector, as described above, may be a component in the storage array 120. A processing location in the write path, on the other hand, may describe what process in the write path was occurring during the dataset integrity error. For example, a processing location may be a duplication of a dataset from one controller node. As another example, a processing location may be sending a dataset to persistent storage. A processing location at which the error occurred may be determined, based, at least in part, on the input and output state of storage array 120. In some examples, instructions 114 includes instructions executable by processing resource 101 such that computing device 100 receives information that a dataset integrity error has occurred and determines the input and output state of the controller node on which the dataset integrity error was detected. In some examples, instructions 114 includes instructions to determine the input and output processing state of the write request in which the dataset integrity error occurred on the specific controller node. In some examples, instructions 114 may also include instructions to record the processing location in the error database in memory, as discussed above.

In some examples, machine-readable storage medium 110 may include instructions to determine a malfunctioning component in storage array 120. In some examples, numerous dataset integrity errors, detectors associated with those dataset integrity errors, and last writers associated with those dataset integrity errors may be analyzed to determine a common component. This is discussed in relation to method 600 of FIG. 6.

In some examples, machine-readable storage medium 110 may include instructions to record an occurrence time of the dataset integrity error detection. In some examples, an occurrence time may include a date of error detection and a timestamp. In some examples, machine-readable storage may also include instructions to display the dataset integrity error, the detector, the last writer, the processing location, and/or the occurrence time on a user output device, such as a liquid crystal display, video monitor, touch screen display, etc.

Figure 2:
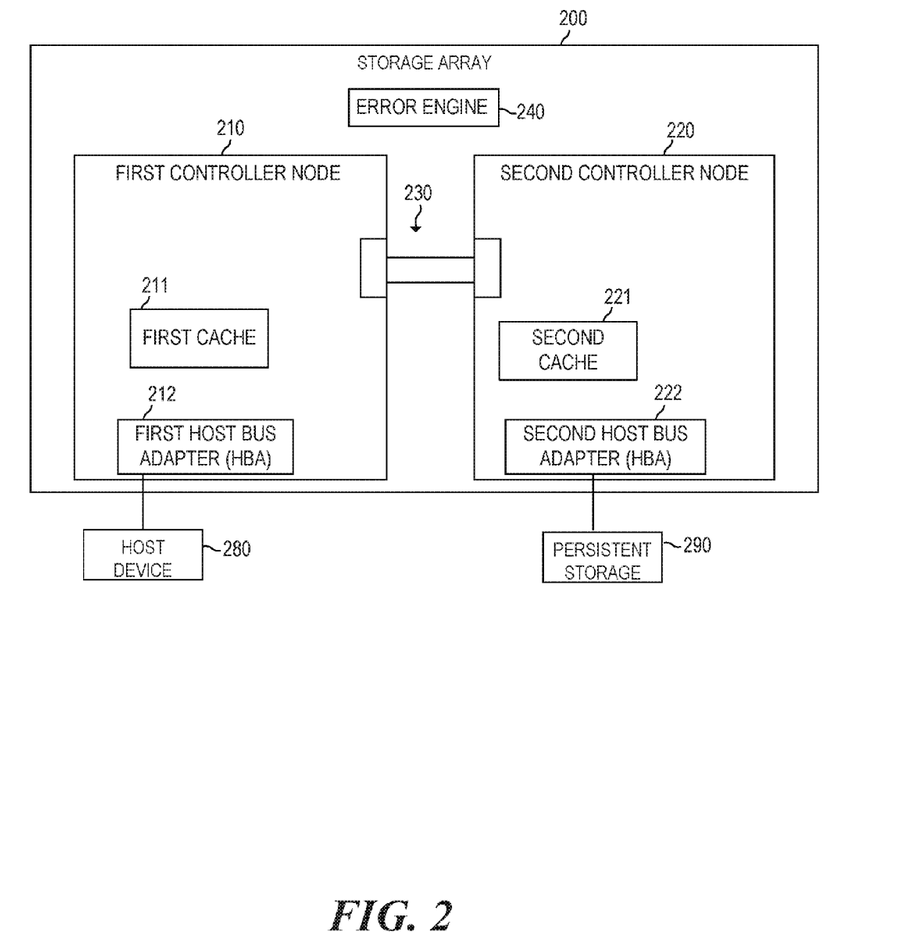
FIG. 2 is a block diagram of a storage array with an error engine, according to some examples.
Figure 3:
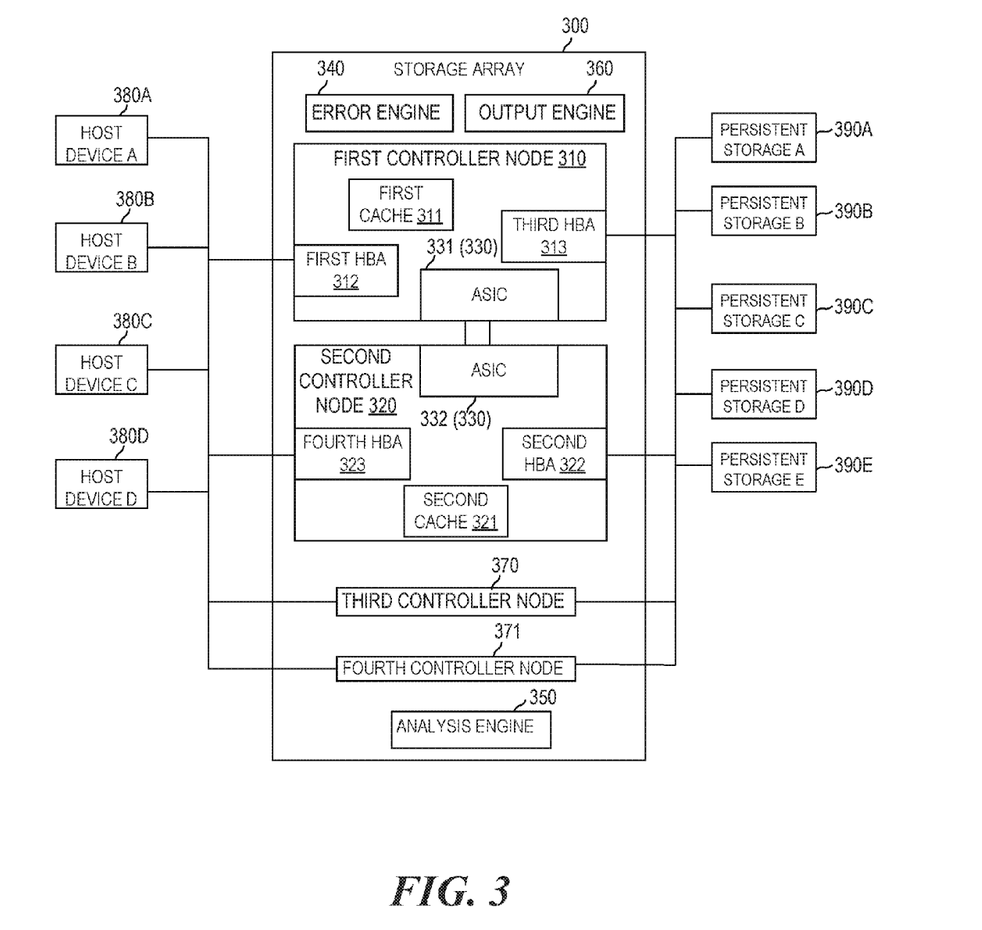
FIG. 3 is a block diagram of a storage array with an error engine, an output engine, and an analysis engine, according to some examples.

Computing device 100 of FIG. 1, which is described in terms of processors and machine-readable storage mediums, may include structural or functional aspects of storage array 200 of FIG. 2 or storage array 300 of FIG. 3, which are described in terms of functional engines containing hardware and software. Additionally, while the functionalities of instructions 111-114 are shown in FIG. 1 as being executable by processing resource 101 in computing device 100 that is separate from controller nodes 121 and 122 of storage array 120, in other examples, instructions 111-114 may be encoded on a machine-readable storage medium of storage array 120. For example, instructions 111-114 may be encoded on a machine-readable storage medium in controller node 121 and executable by a processing resource of controller node 121. In those examples, instructions 111-114 may be executable by a processing resource of controller node 121 to perform the functionalities described above in relation to instructions 111-114 for dataset integrity errors detected by components of first controller node 121 and not second controller node 122. Additionally, second controller node 122 may also include its own set of instructions 111-114. For example, instructions 111-114 relative to second controller node 122 may be encoded on a machine-readable storage medium in controller node 122 and be executable by a processing resource of controller node 122. In those examples, instructions 111-114 encoded on second controller node 122 may be for dataset integrity errors detected by components of second controller node 122 and not first controller node 121.

FIG. 2 is a block diagram of a storage array 200 with a first controller node 210 and a second controller node 220. Storage array 200, like computing device 100, may be a web-based server, a local area network server, a cloud-based server, computer networking device, chip set, desktop computer, workstation, or any other processing device or equipment. In some examples, storage array 200 interfaces with a host device 280 and persistent storage 290. In some examples, storage array 200 interfaces with host device 280 and persistent storage 290 over a communication network (not shown). In some examples, communication network may be an individual network or a collection of many such individual networks interconnected with each other and functioning as a single large network (e.g., the Internet or an intranet). In some examples, communication network may be implemented as a local area network (LAN), wide area network (WAN), etc. In other examples, storage array 200 may be directly coupled to host device 280 and/or persistent storage 290.

Storage array 200 includes a first controller node 210, a second controller node 220, an interconnect engine 230, and an error engine 240. Each of these aspects of storage array 200 will be described below. Other engines and components may be added to storage array 200 for additional functionality.

First controller node 210 of storage array 200 may include a first cache 211 and a first host bus adapter (HBA) 212. In some examples, first cache 211 is a storage medium of first controller node 210 that allows controller node 210 and storage array 200 quick access to data held in first cache 211. In some examples, first cache 211 may hold first dataset description data. In some examples, first cache 211 may also hold a first dataset. As discussed above, the first dataset includes an original data block transferred from host device 280 (the data that is to be stored in persistent storage) and protection information associated with the original data block. The first dataset description data includes information describing the first dataset.

As discussed above, the first dataset description data may include a last writer of the first dataset. In some examples, the first dataset description data may include a last writer for each dataset. In other examples, the first dataset description data may include a last writer representing the last writer of multiple datasets (e.g., when the first dataset description data describes a last writer for a cache page rather than a dataset). Thus, the first dataset and the first dataset description data may be linked to each other, but may be distinct from each other.

First host bus adapter (HBA) 212 is a physical component that allows storage array 200 (and specifically first controller node 210) to communicate with host device 280 and to process a write request of host device 280. Thus, first HBA 212 acts as a front-end port to communicate with host device 280. When a write request is received from host device 280, the dataset may be transferred into first cache 211 by first HBA 212. In some examples where host device 280 does not support protection information capabilities, and as discussed above, first HBA 212 may add protection information to the original data block from host device 280 on its transfer into first cache 211. In other examples, where host device 280 has protection information capabilities, the protection information is added by a component of host device 280. The first HBA 212 may validate the protection information before it transfers the dataset into first cache 211. Thus, in some examples, the first HBA includes instructions to validate the protection information (e.g., by computing a CRC over the data block and comparing the newly computed CRC to the CRC included in the protection information). The first HBA 212 may additionally process write requests originally issued by first controller node 210 (i.e. write requests generated internally by storage array 200). For example, the first HBA 212 may transfer data in a random access memory (e.g., metadata, etc.) of first controller node to first cache 211, adding protection information to the data. In three of the above examples, the first HBA may update first dataset description data to reflect that it has written the dataset that exists in first cache 211.

Second controller node 220 of storage array 200 may include a second cache 221 and a second host bust adapter 222.

Second cache 221, like first cache 211 of first controller node 210, is a storage medium of second controller node 220 that allows second controller node 220 (and storage array 200) quick access to the data held in second cache 221. In some examples, second cache 221 may hold a dataset that is transferred to it from first controller node 210. In some examples, the dataset may include an original data block from the host device 280 and protection information that was associated to original data block (e.g. by either the host device 280 or first HBA 212). This is because storage array 200 may duplicate original data blocks from host devices (or data blocks internally generated by storage array 200) into multiple nodes in the storage array 200. Second cache 221 may also hold second dataset description data. Second dataset description data may reflect information associated with second dataset, including a writer of second dataset.

Second host bus adapter 222, like first host bus adapter 212, is a physical component that allows storage array 200 (and specifically second controller node 220) to communicate with a persistent storage 290 and to process a write request of host device 280 to persistent storage 290. Persistent storage 290 may be implemented by disk drives or volumes. Thus, second HBA 222 acts as a back-end port to communicate with persistent storage 290. In a write request, second HBA may transfer a dataset held in second cache 221 (e.g., second dataset) to persistent storage 290. Before transferring the dataset to persistent storage 290, second HBA may validate the integrity of the dataset through reference to the protection information associated with the dataset. Responsive to it being unable to validate the integrity of the dataset, it detects a dataset integrity error. Second controller node 220 may send a signal to error engine 240 to reflect the detected dataset integrity error.

In some examples, second dataset description data includes a last writer of dataset held in second cache 221. In some examples, second controller node 220 may also be communicatively connected to host device 280 through its own front-end HBA such that data from host device 280 may be written into second cache 221 by the front-end HBA of second controller node 220. This is discussed in relation to FIG. 3.

Interconnect engine 230 is an engine of storage array 200 that includes a combination of hardware and software that allows computing device 200 to communicate between first controller node 210 and second controller node 220 to process a write request of host device 280. For example, interconnect engine 230 may copy a dataset that is held in first cache 211 to second cache 221, effectively transferring the dataset into second cache 221. Interconnect engine 230 may also copy first dataset description data held in first cache 211 into second cache 221. Interconnect engine 230 may also update first dataset description data to reflect that interconnect engine 230 wrote the dataset held in second cache 221. Accordingly, second dataset description data will reflect that interconnect engine 230 wrote second dataset. Thus, for example, a first dataset that is held in first cache may have been written into first cache by first HBA. The first dataset description data associated with the first dataset reflects that the first HBA wrote the first dataset. The first dataset along with first dataset description data is then copied into second cache by interconnect engine 230. The version held in second cache 221 is characterized as second dataset and second dataset description data. The interconnect engine 230 updates the second dataset description data, erasing the first HBA as the writer and listing the interconnect engine 230 as the writer.

Interconnect engine 230 may also allow storage array 200 to validate the integrity of the dataset transferred between first controller node 210 and second controller node 220. In some examples, interconnect engine 230 validates the integrity of the dataset held in first cache 211 before it is transferred to second controller node 220. When it cannot validate the integrity of the dataset, interconnect engine 230 may indicate that it has detected a dataset integrity error. In some examples, interconnect engine 230 may validate the integrity of the dataset that is transferred from first cache before interconnect engine 230 writes it into second cache 221. When it cannot validate the integrity of the transferred dataset, interconnect engine 230 may indicate that it has detected a dataset integrity error. In instances where a dataset integrity error is detected, first controller node 210 or second controller node 220 may send a signal to error engine 240. Thus, in some examples, interconnect engine 230 may include a component that resides on first controller node 210 and a component that resides on 220.

In some examples, interconnect engine 230 comprises two application-specific integrated circuits (ASIC) and a communication link between the two application-specific integrated circuits. In some examples, one ASIC may reside on first controller node 210 and one ASIC may reside on second controller node 220.

Error engine 240 is an engine of storage array 200 that includes a combination of hardware and software that allows computing device 200 to record a dataset integrity error detection. Error engine 240 may also allow computing device 200 to determine a last writer of the dataset prior to the dataset integrity error detection. Error engine 240 may be any combination of hardware (e.g., a processor such as an integrated circuit or other circuitry) and instructions (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or at hardware and software hosted at hardware. Additionally, as used herein, the singular forms "a," "an," and "the" include plural referents unless the context clearly dictates otherwise. Thus, for example, the term "engine" is may mean at least one engine or a combination of engines.

When error engine 240 receives a dataset integrity error signal (e.g., from first controller node, from second controller node, etc.), error engine 240 may record the dataset integrity error detection. In some examples, the dataset integrity error may be recorded in an error database stored on a memory on storage array 200 (not shown). Additionally, error engine 240 may receive information in the signal that identifies the detector to error engine 240. Based, at least in part, on this information, error engine 240 may determine the detector. Also, a dataset integrity error signal from either first controller node 210 or 220 may include an address. Based, at least in part, on this address, the dataset with the error may be determined. Error engine 240 may then query the dataset description data associated with the dataset with the error to determine the last writer of the dataset.

For example, before a first dataset written into first cache 211 by first HBA 212 is copied to second cache 211, interconnect engine 230 may validate the integrity of the dataset by reference to the protection information. Responsive to it being unable to validate the integrity, interconnect engine 230 indicates that a dataset integrity error has occurred. Error engine 240 determines from the information in the signal sent to it that interconnect engine 230 detected the dataset integrity error. Additionally, error engine 240 determines from the address in the signal that the first dataset in first cache contains the error and queries the first dataset description data. First dataset description data indicates that first HBA last wrote the dataset.

As another example, before a second dataset held in second cache 221 is transferred to persistent storage 290, second HBA 222 may validate the integrity of the second dataset. Responsive to it being unable to validate the integrity, second HBA 222 indicates that a dataset integrity error has occurred. Error engine 240 determines from the information in the signal sent to it that second HBA detected the dataset integrity error. Additionally, error engine 240 determines from the address in the signal that the second dataset in second cache contains the error and queries the second dataset description data. Second dataset description data indicates that the interconnect engine 230 last wrote the dataset.

Error engine 240 may also allow storage array 200 to record the last writer of a dataset integrity error in an error database, as discussed above. Additionally, in some examples, error engine 240 may allow storage array 200 to determine a processing location in the write request that is associated with the dataset integrity error. As discussed above in relation to instructions 114, error engine 240 may do this based, at least in part, on the input and output state of storage array 200. The discussion above in relation to processing location is also applicable here.

Each of interconnect engine 230 and error engine 240 may be any combination of hardware (e.g., a processor such as an integrated circuit or other circuitry) and instructions (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or at hardware and software hosted at hardware. For example, the functionalities of each engine may be implemented by an algorithm of at least two steps. Additionally, as used herein, the singular forms "a," "an," and "the" include plural referents unless the context clearly dictates otherwise. Thus, for example, the term "engine" is may mean at least one engine or a combination of engines.

Additionally, each of interconnect engine 230 and error engine 240 can include at least one machine-readable storage mediums (for example, more than one) and at least one processing resource (for example, more than one). For example, software that provides the functionality of engines 230 and 240 on storage array 200 can be stored on a memory of a computer to be executed by a processing resource of the computer. In some examples, each engine of computing device 200 may include hardware in the form of a microprocessor on a single integrated circuit, related firmware, or other software for allowing microprocessor to operatively communicate with other hardware of computing device 200.

While error engine 240 is shown in FIG. 2 as being external to first controller node 210 and second controller node 220 and applicable to dataset integrity errors detected by both first controller node 210 and second controller node 220, in other examples, first controller node 210 may have its own error engine and second controller node 220 may have its own error engine. In examples where each controller node has its own error engine, the error engine for first controller node 210 may be applicable to dataset integrity errors detected by first controller node 210 and the error engine for second controller node 220 may be applicable to dataset integrity errors detected by second controller node 220. Additionally, in some examples where each controller node has its own error engine, the error engine for each respective controller node may be internal to each controller node.

Storage array 200 of FIG. 2 may include structural or functional aspects of computing device 100 of FIG. 1 or storage array 300 of FIG. 3. In some examples, storage array 200 may include an analysis engine, as discussed in relation to analysis engine 350 in FIG. 3, or output engine, similar to output engine 360 in FIG. 3.

FIG. 3 is a block diagram of a storage array 300 with a first controller node 310, a second controller node 320, an interconnect 330 comprised of ASIC 331 and ASIC 332, an error engine 340, an analysis engine 350, an output engine 360, a third controller node 370, and a fourth controller node 371. While there are four controller nodes in FIG. 3, storage array 300 is not limited to the four controller nodes. For example, storage array 300 may have two controller nodes, six controller nodes, eight controller nodes, etc.)

First controller node 310 includes a first HBA 312, a first cache 311, a third HBA, and ASIC 331 (part of interconnect 330). First HBA 312 is similar to first HBA 212, as described in relation to FIG. 2, except that first HBA 312 allows first controller node 310 to communicate with numerous host devices 380A-380D. Thus, first HBA 312 allows first controller node 310 to process write requests from host device A 380A, host device B 380B, host device C 380C, and host device 380D. While four host devices are shown, storage array 300 is not limited to communicating to four host devices.

First cache 311 is similar to first cache 211. Thus, description of first cache 211 is also applicable to first cache 311.

Third HBA 313 is similar to second HBA 213, as described in relation to FIG. 2, except that third HBA 313 allows first controller node 310 to communicate with a cage of persistent storage devices, e.g., persistent storage A 390A, persistent storage B 390B, persistent storage 390C, persistent storage 390D, and persistent storage E 390E. While five persistent storages are shown, storage array 300 is not limited to communicating with five persistent storages. Thus, third HBA 313 acts as a back-end port HBA for first controller node 310, allowing first controller node 310 to transfer a dataset stored in first cache 311 to a persistent storage.

ASIC 331 is a component of interconnect 330 that resides on first controller node 310. ASIC 331 is linked to ASIC 332 on second controller node 320. Thus, ASIC 331 and ASIC 332 are included in interconnect 330. Accordingly, interconnect 330 is similar to interconnect engine 230, except that interconnect 330 is comprised of two ASICs and a communication link between the two ASICs. Additionally, interconnect 330 may allow storage array 300 to transfer a dataset held in second cache 321 to first cache 311. Additionally, while not shown, interconnect 330 may also allow first controller node 310 to transfer data to and receive data from third controller node 370 and/or fourth controller node 371. In those examples, a corresponding ASIC may reside on third controller node 370 and a corresponding ASIC may reside on fourth controller node 371.

Second controller node includes a fourth HBA 323, a second HBA 322, a second cache 321, and ASIC 332 (part of interconnect 330). Second HBA 322 is similar to second HBA 222 as discussed in relation to FIG. 2, except that second HBA 322 allows second controller node to communicate with numerous persistent storages. Thus, second HBA allows second controller node 320 to transfer data in the processing of a write request to persistent storage A 390A, persistent storage B 390B, persistent storage C 390C, persistent storage D 390D, and/or persistent storage E 390E. Second cache 321 is similar to second cache 221. Thus, the description of second cache 221 is applicable here to second cache 321.

Fourth HBA 323 is similar to first HBA 112, except that fourth HBA 323 allows second controller node 320 to receive write requests and datasets directly from host device A, host device B, host device C, host device D, etc. Thus, fourth HBA 323 acts as a front-end HBA for second controller node 320, allowing second controller node 320 to receive write requests from host devices.

ASIC 332 is a component of interconnect 330 that resides on second controller node 320. ASIC 332 is linked to ASIC 331 on first controller node 310. Additionally, while not shown, second controller 320 may be communicatively connected to third controller node 370 and/or fourth controller node 371 such that it may transfer data to and receive data from third controller node 370 and/or fourth controller node 371 in the processing of data requests from host devices. In those examples, a corresponding ASIC may reside on third controller node 370 and a corresponding ASIC may reside on fourth controller node 371.

Third controller node 370 and fourth controller node 371 may include similar components found in first controller node 310 and second controller node 320. For example, third controller node 370 may include a front-end HBA, a cache, an ASIC, and a back-end HBA. Additionally, fourth controller node 370 may include a front-end HBA, a cache, an ASIC, and a back-end HBA. A front-end HBA of third controller node 370 may allow third controller node to communicate with host devices 380A-380D. The front-end HBA may also allow third controller node 370 to detect a dataset integrity error. A cache of third controller node 370 may hold a dataset transferred from a host device or a dataset transferred from another controller node in the storage array 300. A cache of third controller node 370 may also hold dataset description data to reflect a last writer of the dataset held in the cache. An ASIC may allow third controller node 370 to communicate with other controller nodes to transfer a dataset to and from the nodes. The ASIC may also allow third controller node to detect a dataset integrity error. The back-end HBA may allow third controller node 370 to transfer a dataset stored in the cache to a persistent storage. The back-end HBA may also allow third controller node 370 to detect a dataset integrity error. Fourth controller node 371 may also include similar components.

Error engine 340 is similar to error engine 240. Thus, the description of error engine 240 in relation to FIG. 2 is also applicable to error engine 340.

Analysis engine 350 is an engine of storage array 300 that includes a combination of hardware and software that allows storage array 300 to determine a malfunctioning component of the storage array 300. In some examples, analysis engine 350 may determine a malfunctioning component based, at least in part, on the details of one dataset integrity error. For example, a single dataset integrity error will have associated with it, a last writer, and a detector. Based on the last writer and the detector, analysis engine 350 may determine a component of the storage array 300 that is causing the error. In some examples, analysis engine 350 may determine a malfunction component based, at least in part, on the details of two dataset integrity error detections in these examples, a first dataset integrity error will be associated with a first detector and a last writer of the first dataset and a second dataset integrity error will be associated with a second detector and a last writer of the second dataset. Analysis engine 350 may determine a malfunctioning component based on any and/or all of these details. For example, analysis engine 350 may determine a malfunctioning component based on the first detector, the second detector, and the last writer of the first dataset, in other examples, analysis engine 350 may determine a malfunctioning component based on the first detector, the second detector, the last writer of the first dataset, and the last writer of the second dataset.

For example, responsive to the two dataset integrity errors having a common detector (i.e., the first detector is the same as the third detector), analysis engine 350 may determine that the malfunctioning component of storage array 300 is the detector. As another example, responsive to the two dataset integrity errors having a common last writer, analysis engine 350 may determine that the malfunctioning component of storage array 300 is the common last writer. In some examples, analysis engine 350 may determine a malfunctioning component of storage array 300, based at least in part, on numerous details from numerous dataset integrity error detections.

In some examples, analysis engine 350 may also determine a malfunctioning component based, at least in part, on the specific controller node in which the dataset integrity error was detected. For example, multiple dataset integrity errors detected on a common node may indicate that the common node may have node-specific issues. In some examples, analysis engine 350 may determine a malfunctioning component based, at least in part, on a general assessment of the health of the storage array (e.g., whether a specific drive is failing, etc.).

While analysis engine 350 is shown in FIG. 3 as being external to first controller node 310, second controller node 320, third controller node 370, and fourth controller node 371 and applicable to dataset integrity errors detected by controller nodes 310, 320, 370, and 371, in other examples, each of controller nodes 310, 320, 370, and 371 may have its own analysis engine. In examples where each controller node has its own analysis engine, the analysis engine for first controller node 310 may be applicable to dataset integrity errors detected by first controller node 310, the analysis engine for second controller node 320 may be applicable to dataset integrity errors detected by second controller node 320, the analysis engine for third controller node 370 may be applicable to dataset integrity errors detected by third controller node 370, and the analysis engine for fourth controller node 371 may be applicable to dataset integrity errors detected by fourth controller node 371. Additionally, in some examples where each controller node has its own error engine, the error engine for each respective controller node may be internal to each controller node.

Output engine 360 is an engine of storage array 300 that includes a combination of hardware and software that allows storage array 300 to display the dataset integrity error and the last writer of the dataset. Thus, in some examples, output engine 360 allows storage array 300 to aggregate details stored in the error database and send the details in a signal that may be displayed on a user output device. In some examples, output engine 360 may be communicatively linked to a user output device. In some examples, output engine 360 may allow storage array 300 to display dataset integrity errors even after a shutdown and re-boot of storage array 300. In these examples, output engine 360 may query the error database to extract the details of dataset integrity errors that occurred prior to the shutdown (failure) of storage array 300.

Each of engines 340, 350, and 360 and any other engines, may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted on hardware (e.g., software that is stored in a memory and executed or interpreted by a processor), or by hardware and software hosted on hardware. For example, the functionalities of each engine may be implemented by an algorithm of at least two steps. Additionally, as used herein, the singular forms "a," "an," and "the" include plural referents unless the context clearly dictates otherwise. Thus, for example, the term "engine" is may mean at least one engine or a combination of engines.

Each engine of storage array 300 can include at least one machine-readable storage mediums (for example, more than one) and at least one processing resource (for example, more than one). For example, software that provides the functionality of engines on storage array 300 can be stored on a memory of a computer to be executed by a processing resource of the computer. In some examples, each engines of storage array 300 may include hardware in the form of a microprocessor on a single integrated circuit, related firmware, or other software for allowing microprocessor to operatively communicate with other hardware of storage array 300.

Storage array 300 of FIG. 3 may include structural or functional aspects of computing device 100 of FIG. 1 or storage array 200 of FIG. 2.

Figure 4:
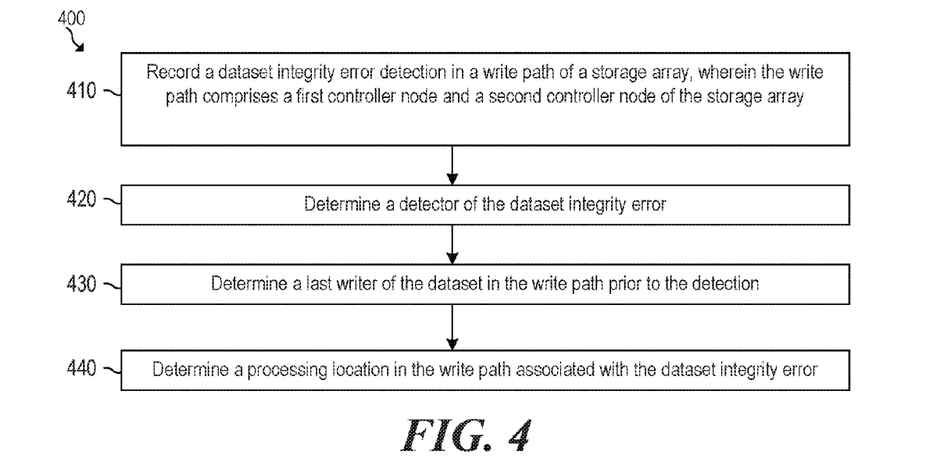
FIG. 4 is a flowchart of a method of determining a last writer of a dataset in a dataset integrity error detection, according to some examples.

FIG. 4 illustrates a flowchart for an example method 400 to determine a last writer of a dataset in a dataset integrity error detection. Although execution of method 400 is described below with reference to computing device 100 of FIG. 1, other suitable systems for execution of method 400 may be utilized (e.g., storage array 200 or storage array 300). Additionally, implementation of method 400 is not limited to such examples and method 400 may be used for any suitable device or system described herein or otherwise.

At 410 of method 400, processing resource 101 may execute instructions 111 encoded on machine-readable storage medium 110 to record a dataset integrity error detection in a write path of storage array 120. In some examples, the write path comprises a first controller node 121 and a second controller node 122 of storage array 120. In some examples, the write path comprises a host device and a persistent storage attached to storage array 120. At 420 of method 400, processing resource 101 may execute instructions 112 encoded on machine-readable storage medium 110 to determine a detector of the dataset integrity error. As discussed above, a detector may be a component in either first controller node 121 or second controller node 122.

At 430 of method 400, processing resource 101 may execute instructions 113 to determine a last writer of the dataset in the write path prior to the detection that was recorded at 410. As discussed above, a last writer of a dataset may be a component in either the first controller node 121 or second controller node 122 (e.g., a front-end HBA, an interconnect engine, etc.)

At 440 of method 400, processing resource 101 may execute instructions 114 to determine a processing location in the write path associated with the dataset integrity error.

In some examples, functionalities described herein in relation to FIG. 4 may be provided in combination with functionalities described herein in relation to any of FIGS. 1-2, and 5-6. Although the flowchart of FIG. 4 shows certain functionalities as occurring in one step, the functionalities of one step may be completed in at least one step (e.g., in multiple steps). Additionally, although the flowchart of FIG. 4 shows a specific order of performance of certain functionalities, method 400 is not limited to that order. For example, some of the functionalities shown in succession in the flowchart may be performed in a different order, may be executed concurrently or with partial concurrence, or a combination thereof. For example, 410 and 420 may be performed with partial occurrence.

Figure 5:
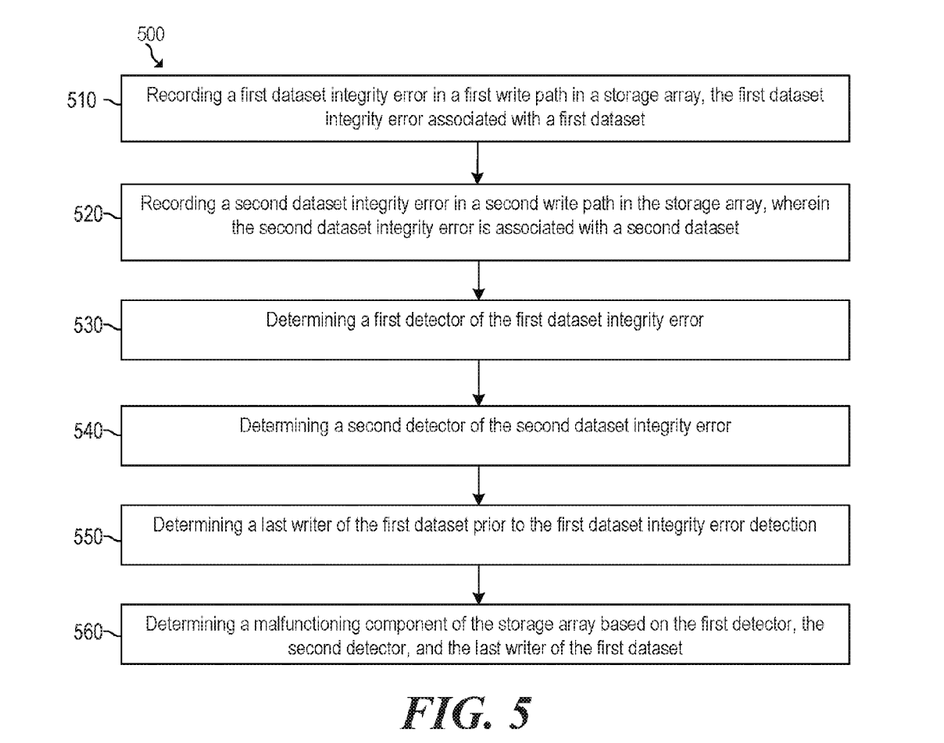
FIG. 5 is a flowchart of a method of determining a malfunctioning component of a storage array, according to some examples.

FIG. 5 illustrates a flowchart for an example method 500 to determine a malfunctioning component of a storage array. Although execution of method 500 is described below with reference to storage array 200 of FIG. 2, other suitable systems for execution of method 500 may be utilized (e.g., storage array 300 or computing device 100). Additionally, implementation of method 500 is not limited to such examples and method 500 may be used for any suitable device or system described herein or otherwise.

At 510 of method 500, error engine 240 records a first dataset integrity error in a first write path in storage array 200. In some examples, the first write path includes a first controller node 210 of storage array 200 and a second controller node 220 of storage array 200. The first dataset integrity error is associated with a first dataset. In some examples, the first dataset integrity error may be stored in an error database, as discussed above. At 520 of method 500, error engine 240 records a second dataset integrity error in a second write path in storage array 200. The second dataset integrity error is associated with a second dataset. In some examples, the second write path includes the first controller node 210 of storage array 200 and a second controller node 220 of storage array 200. In some examples, the second dataset integrity error may be stored by error engine 240 in an error database.

At 530 of method 500, error engine 240 determines a first detector of the first dataset integrity error. Non-limiting examples of a detector may include first HBA 212, second HBA 222, interconnect engine 230, or instructions included in storage array 200. The first detector may be determined by information that is included in the error signal that identifies the detector to error engine 240. At 540 of method 500, error engine 240 determines a second detector of second dataset integrity error. Non-limiting examples of a detector may include first HBA 212, second HBA 222, interconnect engine 230, or instructions included in storage array 200. At 550 of method 500, error engine 240 determines a last writer of the first dataset prior to the first dataset integrity error detection. As discussed above, error engine 240 may do this by first determining a dataset that includes the error. This may be determined by the address sent to the error engine 240 that identifies the detector. Based on this address, error engine 240 may determine the dataset with the error. The error engine 240 may then query a dataset description data associated with the dataset (e.g., held in a first cache 211 or a second cache 221) to determine the last writer of the dataset with the error.

At 560, analysis engine (not shown in FIG. 2) determines a malfunctioning component of storage array 200. In some examples, the determination may be done based, in part on, the first detector determined at 530, the second detector determined at 540, and the last writer of the first dataset determined at 550. In some examples, method 500 may also include error engine 240 determining a last writer of the second dataset prior to the second data integrity error detection. Accordingly, in these examples, at 560, analysis engine may determine a malfunctioning component, based, at least in part, of the first detector, the second detector, the last writer of the first dataset, and the last writer of the second dataset.

Although the flowchart of FIG. 5 shows a specific number of dataset integrity errors, detectors, and last writers, method 500 is not limited the number shown. In some examples, functionalities described herein in relation to FIG. 5 may be provided in combination with functionalities described herein in relation to any of FIGS. 1-4, and 6. Although the flowchart of FIG. 5 shows certain functionalities as occurring in one step, the functionalities of one step may be completed in at least one step (e.g., in multiple steps). Additionally, although the flowchart of FIG. 5 shows a specific order of performance of certain functionalities, method 500 is not limited to that order. For example, some of the functionalities shown in succession in the flowchart may be performed in a different order, may be executed concurrently or with partial concurrence, or a combination thereof. For example, 510 and 520 may be performed concurrently. Additionally, although the flowchart of FIG. 5 describes a first dataset integrity error that is associated with a first dataset and a second dataset integrity error that is associated with a second dataset, the flowchart of FIG. 5 may also be applied to a first dataset integrity error and a second dataset integrity error that is associated with the same dataset. For example, at 510, error engine 240 may record a first dataset integrity error in a write path in a storage array, the error associated with a dataset. At 510, error engine 240 may record a second dataset integrity error in the same write path in a storage array, the second error associated with the same dataset as the first dataset integrity error.

Figure 6:
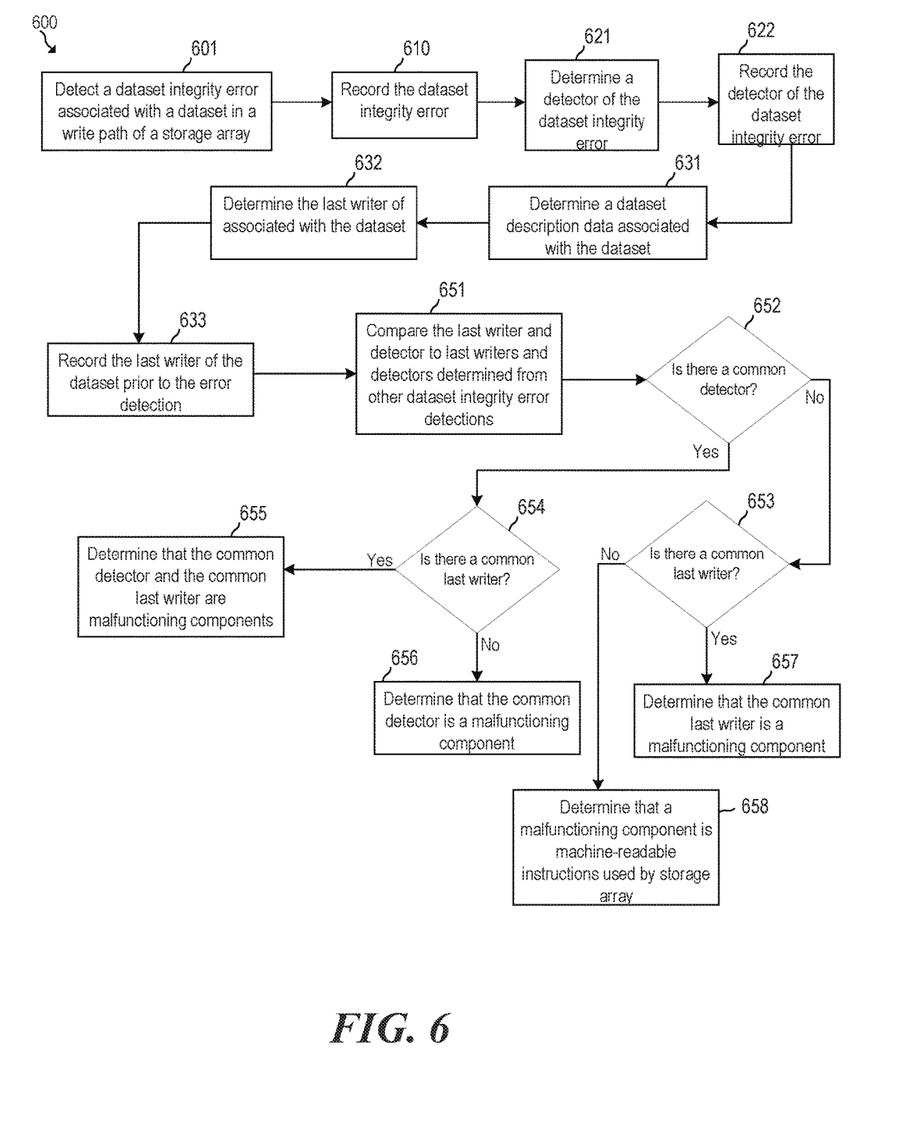
FIG. 6 is a flowchart of a method of detecting a dataset integrity error and determining a last writer of the dataset, according to some examples.

FIG. 6 illustrates a flowchart for an example method 600 to determine a malfunctioning component of a storage array. Although execution of method 600 is described below with reference to storage array 300 of FIG. 3, other suitable systems for execution of method 600 may be utilized (e.g., storage array 200 or computing device 100). Additionally, implementation of method 600 is not limited to such examples and method 600 may be used for any suitable device or system described herein or otherwise.

At 601 of method 600, a component of storage array 300 may detect a dataset integrity error that is associated with a dataset in a write path of storage array 300. This detection may be done by first HBA 312 on first controller node 310, ASIC 331 of interconnect 331 on first controller node 310, third HBA 313 on first controller node 310, fourth HBA 323 on second controller node 320, ASIC 332 of interconnect 331 on second controller node 310, second HBA 322 on second controller node, and similar components on both third controller node 370 and fourth controller node 371, etc. In some examples, the detection may be by second HBA 322 of an integrity error of a dataset that is held in second cache 321. Second HBA 322 may validate the integrity of the dataset before transferring to a persistent storage 390A-390E. In some examples, the detection may be by ASIC 331 of an integrity error of a dataset that is held in first cache 311. ASIC 331 may validate the integrity of the dataset before transferring to another node (e.g., second controller node 320, third controller node 370, fourth controller node 371, etc.).

At 610 of method 600, error engine 340 receives an error signal that results from 601 and records the dataset integrity error. As discussed above, error engine 340 may record the dataset integrity error in an error database. At 621 of method 600, error engine 340 of storage array determines a detector of the dataset integrity error. 621 is accomplished in the same manner as discussed above in relation to 530 of method 500. At 621 of method 600, error engine 340 of storage array 300 records the detector of the dataset integrity error determined at 621. At 631 of method 600, error engine 340 determines dataset description data that is associated with the dataset. This may be accomplished by reviewing the address included in the error signal, which identifies a detector in the storage array 300 to error engine 340. In some examples, and as described above, the address may not be included in the error signal, but separately obtained. Based on the address, the dataset in which the error occurred may be determined and from this dataset, error engine 340 may determine the dataset description data that is associated with the dataset. At 632 of method 600, error engine 340 determines the last writer associated with the dataset by querying the dataset description data for the last writer held in the dataset description data.

At 633, error engine 340 records the last writer of the dataset prior to the error detection. Thus, in some examples, a last writer of dataset in storage array 300 may be tracked but not stored until there is a dataset integrity error that is detected.

At 651 of method 600, analysis engine 350 may compare the last writer determined in 632 by error engine 340 and the detector determined in 621 to last writers and detectors determined from other dataset integrity error detections. In some examples, these other dataset integrity error detections may be stored in error database. At 652 of method 600, analysis engine 350 may determine if there is a common detector in the comparison at 651.

Responsive to a determination that there is a common detector, method 600 proceeds to 654. At 654, analysis engine 350 may determine if there is a common last writer in the error detections compared at 651. Responsive to a determination that there is no common last writer, method 600 proceeds to 656. At 656 of method 600, analysis engine 350 determines that the common detector is a malfunctioning component of storage array 300. Responsive to a determination at 654 that there is a common last writer, method proceeds to 655. At 655, analysis engine 350 may determine that the common detector (determined at 652) and the common last writer (654) are malfunctioning components of storage array 300.

Referring back to 652, responsive to a determination that there is no common detector at 652, method 600 proceeds to 653. At 653, analysis engine 350 may determine if there is a common last writer. Responsive to a determination that there is a common last writer, method proceeds to 657. At 657, analysis engine 350 determines that the common last writer is a malfunctioning component. Responsive to determination at 653 that there is no common last writer, method proceeds to 658. At 658 of method 600, analysis engine 350 may determine that a malfunctioning component of storage array 300 is related to software (machine-readable instructions) used by storage array 300 that may affect the storage array 300.

Table 1 below provides an example of the information of dataset integrity error that may be recorded by examples discussed herein.

TABLE 1

| Detector | Last Writer | Processing Location | Dataset Integrity Error | Occurrence Time |
|---|---|---|---|---|
| Controller Node 1 ASIC | Controller Node 1 ASIC | Write Duplication | Error in CRC Error in Ref | Date 1 TimeStamp1 |
| Controller Node 1 ASIC | Front-end HBA controller node 1 | Initial write | Error in CRC | Date 2 TimeStamp2 |
| Back-end HBA Controller Node 2 | ASIC (Controller Node 1 to Node 2) | Commitment to persistent storage | Error in CRC | Date 3 TimeStamp3 |

In the first example shown in Table 1, the dataset integrity error included an error in the CRC and in the reference in the protection information associated with the dataset. The detector is determined to be the ASIC in controller node 1. The last writer of the dataset is also the ASIC in controller node 1. The processing location of the error in the write path was during the duplication of the dataset. In other words, this error is detected while the storage array is trying to duplicate a dataset into another controller node. The error detection occurred on Date 1 with TimeStamp1. In the second example shown in Table 1, the dataset integrity error included an error in the CRC. The detector is determined to be the ASIC in controller node 1. The last writer of the dataset with the error is determined to be the front-end HBA of controller node 1. The processing location of the error in the write path was during the initial write of the data into cache of controller node 1. The error detection occurred on Date 2 with TimeStamp2. In the third example shown in Table 1, the dataset integrity error included an error in CRC. The detector is determined to be the back-end HBA of controller node 2. The last writer of the dataset is determined to be ASIC on Controller Node 2. The processing location of the error in the write path is during the commitment of the dataset to a persistent storage. The error detection occurred on Date 3 with TimeStamp3. The types and amounts of detectors, last writers, processing locations, dataset integrity errors, and occurrence times are for the purposes of explanation and are not restrictive.

All of the features disclosed in this specification (including any accompanying claims, abstract and drawings), and/or all of the elements of any method or process so disclosed, may be combined in any combination, except combinations where at least some of such features and/or elements are mutually exclusive. In the foregoing description, numerous details are set forth to provide an understanding of the subject matter disclosed herein. However, examples may be practiced without some or all of these details. Other examples may include modifications and variations from the details discussed above. The appended claims may cover such modifications and variations.

What is claimed is:

1. A non-transitory machine-readable storage medium comprising instructions that, when executed by a processing resource, cause the processing resource to:
record a dataset integrity error detection for an associated dataset, the dataset integrity error detected in a write path of a storage array, wherein the write path provides an indication of a path taken between components of the storage array for data to be stored on persistent storage of the storage array responsive to a write request and comprises a first controller node and a second controller node of the storage array;
determine a detector of the dataset integrity error, the detector indicating a detecting component of the storage array that identified the dataset integrity error;
determine a last writer of the associated dataset in the write path prior to the dataset integrity error detection, the last writer indicating a writing component of the storage array that represents a most recent component to alter or generate the associated dataset; and
determine a processing location in the write path associated with the dataset integrity error.

2. The non-transitory machine-readable storage medium of claim 1, further comprising instructions that when executed by the processing resource, cause the processing resource to:
record the detector of the dataset integrity error;
record the last writer of the dataset; and
record the processing location.

3. The non-transitory machine-readable storage medium of claim 1, further comprising instructions that when executed by the processing resource, cause the processing resource to:
display the dataset integrity error, the detector, the last writer, and the processing location on an output device.

4. The non-transitory machine-readable storage medium of claim 1, further comprising instructions that when executed by the processing resource, cause the processing resource to:
determine a malfunctioning component in the storage array based on the detector and the last writer.

5. The non-transitory machine-readable storage medium of claim 1, wherein the dataset comprises a cyclic redundancy check and a logical block address.

6. The non-transitory machine-readable storage medium of claim 1, wherein the instructions to cause the processing resource to determine the processing location in the write path comprises instructions, that when executed by the processing resource, cause the processing resource to analyze an input and output state of the storage array.

7. The non-transitory machine-readable storage medium of claim 1, wherein the write path comprises a persistent storage and a host device.

8. The non-transitory machine-readable storage medium of claim 1, further comprising instructions that when executed by the processing resource, cause the processing resource to:
record an occurrence time of the dataset integrity error detection.

9. A storage array comprising:
a processing resource; and
a non-transitory machine-readable storage medium communicatively coupled to the processing resource, wherein the non-transitory machine-readable storage medium comprises instructions that, when executed by the processing resource, cause the processing resource to:
record a dataset integrity error detection for an associated dataset, the dataset integrity error detected in a write path of a storage array, wherein the write path provides an indication of a path taken between components of the storage array for data to be stored on persistent storage of the storage array responsive to a write request and comprises a first controller node and a second controller node of the storage array;
determine a detector of the dataset integrity error, the detector indicating a detecting component of the storage array that identified the dataset integrity error;
determine a last writer of the associated dataset in the write path prior to the dataset integrity error detection, the last writer indicating a writing component of the storage array that represents a most recent component to alter or generate the associated dataset; and
determine a processing location in the write path associated with the dataset integrity error.

10. The storage array of claim 9, wherein the non-transitory machine-readable storage medium further comprises instructions that when executed by the processing resource, cause the processing resource to:
record the detector of the dataset integrity error;
record the last writer of the dataset; and
record the processing location.

11. The storage array of claim 9, wherein the non-transitory machine-readable storage medium further comprises instructions that when executed by the processing resource, cause the processing resource to:
initiate display of the dataset integrity error, the detector, the last writer, and the processing location on an output device.

12. The storage array of claim 9, wherein the non-transitory machine-readable storage medium further comprises instructions that when executed by the processing resource, cause the processing resource to:
determine a malfunctioning component in the storage array based on the detector and the last writer.

13. The storage array of claim 9, wherein the dataset comprises a cyclic redundancy check and a logical block address.

14. The storage array of claim 9, wherein the non-transitory machine-readable storage medium further comprises instructions that when executed by the processing resource, cause the processing resource to:
determine the processing location in the write path comprises instructions, that when executed by the processing resource, cause the processing resource to analyze an input and output state of the storage array.

15. The storage array of claim 9, wherein the write path comprises a persistent storage and a host device.

16. The storage array of claim 9, wherein the non-transitory machine-readable storage medium further comprises instructions that when executed by the processing resource, cause the processing resource to:
record an occurrence time of the dataset integrity error detection.

* * * * *